United States Patent
Ikezawa (10) Patent No.: US 7,199,563 B2
(45) Date of Patent: Apr. 3, 2007

(54) DC-DC CONVERTER

(75) Inventor: Katsuya Ikezawa, Osaka (JP)

(73) Assignee: Texas Instruments Incorporated, Dallas, TX (US)

( * ) Notice: Subject to any disclaimer, the term of this patent is extended or adjusted under 35 U.S.C. 154(b) by 122 days.

(21) Appl. No.: 11/015,724

(22) Filed: Dec. 17, 2004

(65) Prior Publication Data

US 2005/0156658 A1    Jul. 21, 2005

(30) Foreign Application Priority Data

Dec. 25, 2003   (JP) ............................. 2003-429979

(51) Int. Cl.
*G05F 1/618* (2006.01)

(52) U.S. Cl. .................. 323/266; 323/222; 323/225; 323/259; 323/271; 323/282

(58) Field of Classification Search ................ 323/222, 323/225, 259, 266, 268, 271, 282, 284, 285, 323/299
See application file for complete search history.

(56) References Cited

U.S. PATENT DOCUMENTS

| | | | | |
|---|---|---|---|---|
| 5,278,490 A | * | 1/1994 | Smedley | 323/284 |
| 5,734,258 A | * | 3/1998 | Esser | 323/224 |
| 5,831,418 A | * | 11/1998 | Kitagawa | 323/222 |
| 6,348,779 B1 | * | 2/2002 | Sluijs | 323/222 |
| 6,636,431 B2 | * | 10/2003 | Seki et al. | 363/65 |
| 6,671,143 B2 | * | 12/2003 | Hwang | 361/18 |
| 6,788,033 B2 | * | 9/2004 | Vinciarelli | 323/225 |
| 6,812,676 B2 | * | 11/2004 | Tateishi | 323/225 |
| 6,959,359 B1 | * | 10/2005 | Suzuki et al. | 323/282 |
| 6,977,488 B1 | * | 12/2005 | Nogawa et al. | 323/271 |

* cited by examiner

*Primary Examiner*—Gary L Laxton
(74) *Attorney, Agent, or Firm*—W. James Brady, III; Frederick J. Telecky, Jr.

(57) ABSTRACT

The object of this invention is to improve efficiency in the step-up/down mode and eliminate ringing in the output voltage when switching between the step-up mode and the step-up/down mode. This DC-DC converter has a local feedback control pre-processing circuit 12 arranged between voltage input terminal IN and one of the terminals of choke coil 10 or node $N_x$ as well as an output feedback control booster circuit 14 arranged between the other terminal of choke coil 10 and the voltage output terminal OUT. Pre-processing circuit 12 has switching elements 16 and 18 and control circuit 20 that turns on/off switching elements 16 and 18 in a complementary manner. Control circuit 20 has error amplifier 22, reference voltage generating circuit 24, PWM comparator 26, inverter 28, and low-pass filter (LPF) 30.

6 Claims, 8 Drawing Sheets

DC-DC CONVERTER

CROSS REFERENCE TO RELATED APPLICATIONS

This application claims priority under 35 USC § 119 of Japanese Application Serial No. 2003-429,979, filed Dec. 25, 2003.

FIELD OF THE INVENTION

The present invention pertains to a DC-DC converter used to convert an input DC (direct current) power supply to any DC (direct current) power supply.

A DC-DC converter is a small, light, and highly efficient DC power supply using semiconductor switching elements. It is widely used for electronic devices, etc. In recent years, there has been a strong demand for smaller size, lighter weight, and higher efficiency. The basic working theory of a DC-DC converter is that the switching elements are turned on/off at high frequency, and the ratio of the on-time to total period, that is, the duty cycle, is controlled in a variable manner to keep the DC output voltage at a certain level. The so-called non-insulating or chopper type DC-DC converter can be classified into 3 types: the step-up type that can obtain an output voltage higher than the input voltage, the step-down type that can obtain an output voltage lower than the input voltage, and the step-up/down type that can obtain a constant output voltage independent of the input voltage.

BACKGROUND OF THE INVENTION

Figure 8:
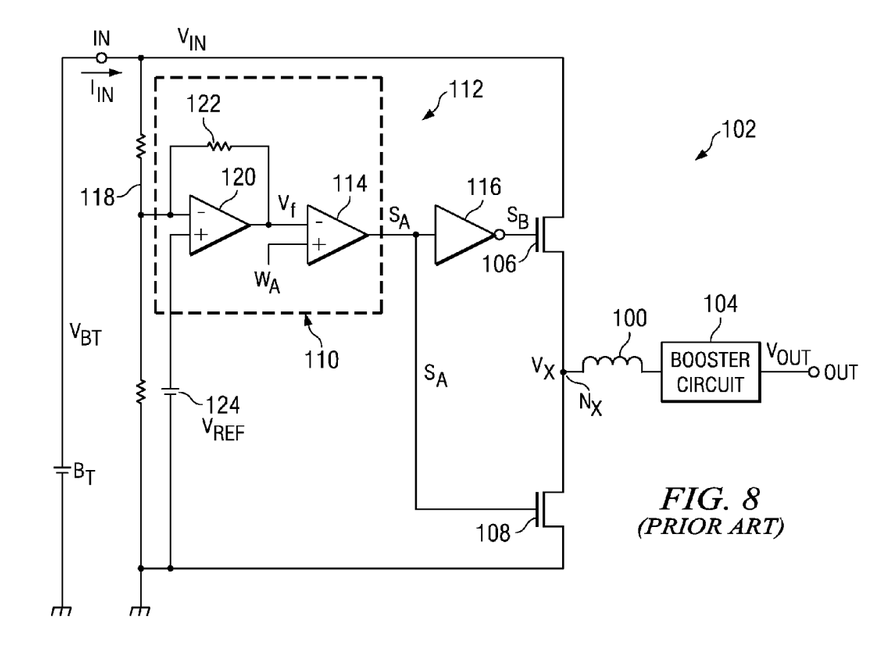
FIG. 8 is a circuit diagram illustrating the configuration of a conventional DC-DC converter.

DC-DC converters that can be used for both step-up conversion and step-up/down conversion are conventionally known. FIG. 8 shows the circuit configuration of a typical example. This DC-DC converter has choke coil 100 used as the inductance element. An input feedforward converter 102 is connected between voltage input terminal IN, which receives a DC input voltage $V_{in}$ from an external battery BT, and node $N_x$, one of the terminals of choke coil 100. An output feedback control booster circuit 104 is connected between the other terminal of choke coil 100 and voltage output terminal OUT. Said booster circuit 104 has a boosting function, which can boost voltage $V_x$ applied from feedforward converter 102 to node $N_x$ (referred to as "node voltage $V_x$" hereinafter) and generate an output voltage $V_{out}$ of the desired level to voltage output terminal OUT. Consequently, feedforward converter 102 must output node voltage $V_x$ lower than the desired level of output voltage $V_{out}$ independent of the level of input voltage $V_{in}$ to node $N_x$.

Feedforward converter 102 is comprised of switching element 106 connected between voltage input terminal IN and node $N_x$, switching element 108 connected between node $N_x$ and the ground potential, and feedforward control circuit 110, which turns on/off or switches said switching elements 106 and 108 in a complementary manner corresponding to the input voltage $V_{in}$ input to voltage input terminal IN. Transistors, for example, NMOS transistors are usually used for said switching elements 106 and 108. Feedforward control circuit 110 has input voltage monitoring circuit 112, PWM (pulse width modulation) comparator 114, and inverter 116. In this case, input voltage monitoring circuit 112 has resistance voltage-dividing circuit 118, operational amplifier 120, feedback resistor 122, and reference voltage generating circuit 124.

In input voltage monitoring circuit 112, a coefficient $-K_a$ ($K_a>0$) determined by the voltage-dividing ratio of resistance voltage-dividing circuit 118 and the resistance of feedback resistor 122 is multiplied to input voltage $V_{in}$, and a constant C (C>0) corresponding to reference voltage $V_{ref}$ sent from reference voltage generating circuit 124 is added to the multiplication result. A DC voltage $V_f$ (referred to as "feedforward voltage $V_f$" hereinafter) corresponding to the final calculation result is obtained. In other words, feedforward voltage $V_f$ can be expressed by the following equation (1).

$$V_f = -K_a V_{in} + C \qquad (1)$$

Figure 9:
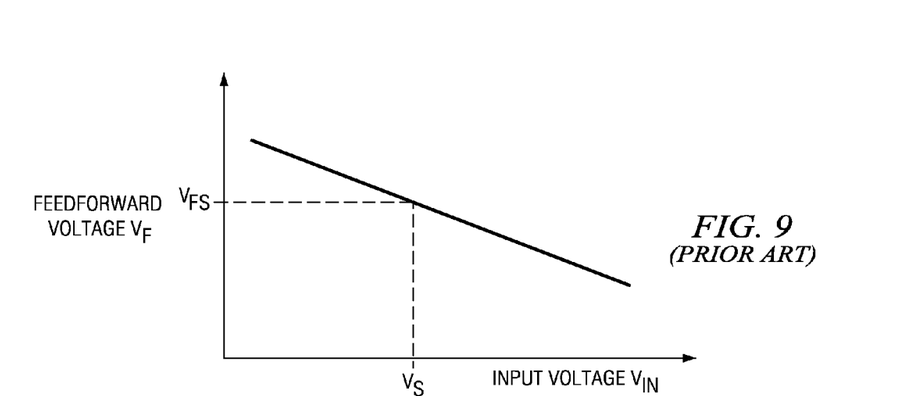
FIG. 9 is a diagram illustrating the relationship between the input voltage and the feedforward voltage in the DC-DC converter shown in FIG. 8.

Consequently, as shown in FIG. 9, as the level of input voltage $V_{in}$ is increased, feedforward voltage $V_f$ becomes lower in reverse proportion to the input voltage. The feedforward voltage $V_f$ sent from input voltage monitoring circuit 112 is input to input terminal (−) of comparator 114. On the other hand, a triangular signal $W_a$ having a prescribed frequency and a prescribed voltage level or peak level (peak-to-peak value) is input from a triangular signal generating circuit (not shown in the figure) to input terminal (+) of comparator 114.

Comparator 114 compares the level of feedforward voltage $V_f$ and the voltage level of triangular signal $W_a$. When $V_f > W_a$, control signal $S_a$ with an output voltage level L is output. When $V_f < W_a$, control signal Sa with level H is output. Control signal $S_a$ is applied to the control terminal of switching element 108. Control signal $S_b$, obtained by inverting $S_a$ using inverter 116, is applied to the control terminal of switching element 106.

Figure 10:
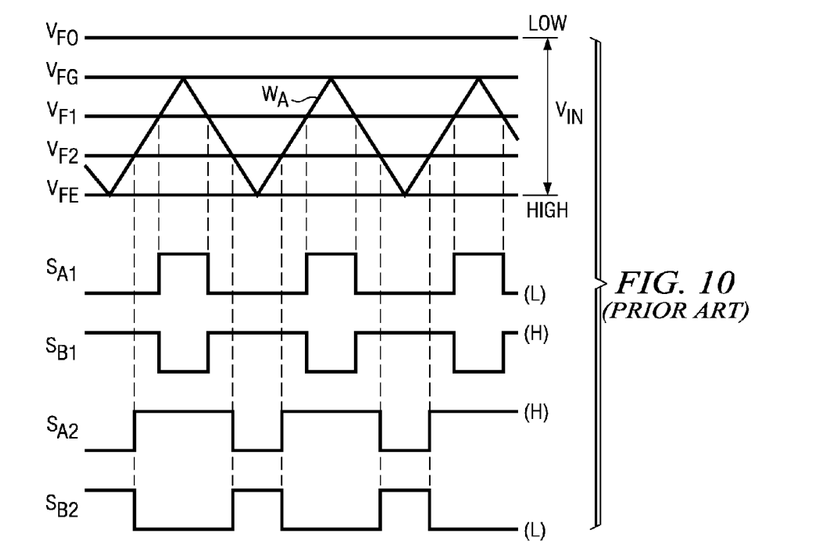
FIG. 10 is a diagram illustrating the effect of the PWM comparator in the DC-DC converter shown in FIG. 8.

In feedforward converter 102, as shown in FIGS. 9 and 10, when input voltage $V_{in}$ is equal to set level $V_s$, feedforward voltage $V_f$ is set to be almost equal to the maximum peak level of triangular signal $W_a$. In this case, set level $V_s$ is set to be much lower than output voltage $V_{out}$ (desired level).

When input voltage $V_{in}$ is lower than set level $V_s$, the relationship of $V_f > W_a$ is maintained, and comparator 114 keeps the output on level L. Control signals $S_a$ and $S_b$ are kept to $S_a$=level L and $S_b$=level H, switching element 106 is kept in the on state, switching element 108 is kept in the off state. As a result, the input voltage $V_{in}$ from voltage input terminal IN is sent to node $N_x$ via switching element 106 in the on state, and node voltage $V_x$ is almost equal to input voltage $V_{in}$ at node $N_x$. Booster circuit 104 receives node voltage $V_x (=V_{in})$ from node $N_x$ via choke coil 100 and outputs generates voltage $V_{out}$ with the desired level to output terminal OUT as a result of a feedback controlled boosting operation. As described above, input voltage $V_{in}$ is extracted through feedforward converter 102 and is then applied to booster circuit 104 via choke coil 100. A boosting operation is performed by the entire DC-DC converter.

When input $V_{in}$ is higher than set level $V_s$, as shown in FIG. 10, feedforward voltage $V_f$ crosses with triangular signal $W_a$, and one cycle of triangular signal Wa is divided into the period of $V_f < W_a$ and the period of $V_f > W_a$. During the period of $V_f < W_a$, $S_a$=level H and $S_b$=level L on the output side of comparator 114. Switching element 108 is turned on, and switching element 106 is turned off. On the other hand, during the period of $V_f > W_a$, $S_a$=level L, $S_b$=level H on the output side of comparator 114. Switching element 106 is turned on, and switching element 108 is turned off. Voltage $E_x$, obtained by averaging node voltage $V_x$ obtained at node $N_x$ over time (referred to as "pseudo input voltage $E_x$" hereinafter), can be expressed by equation (2) as follows, where d is the duty cycle during the period when switching element 106 is on during one cycle of triangular signal $W_a$.

$$E_x = d \cdot V_{in} \quad (2)$$

As described above, when input voltage $V_{in}$ is higher than set level $V_s$, input voltage $V_{in}$ is reduced by feedforward converter 102 to the level of pseudo input voltage $E_x$ corresponding to the duty cycle d and is then applied to booster circuit 104 via choke coil 100. A step-up/down conversion is performed by the entire DC-DC converter.

In the aforementioned conventional DC-DC converter, the duty cycle d in feedforward converter 102 is fixed at d=1 (100%) in the step-up mode. On the other hand, in the step-up/down mode, as can be seen from FIGS. 9 and 10, the duty cycle varies linearly in reverse proportion to input voltage $V_{in}$. In other words, as shown in FIG. 10, the duty cycle d in the step-up/down mode can be expressed as a primary function of feedforward voltage $V_f$ as shown in the following equation (3).

$$d = 1 - (V_{fs} - V_f)/(V_{fs} - V_{fe}) \quad (3)$$

In this case, $V_{fs}$ is the level of $V_f$ when it equals the maximum peak level of triangular signal $W_a$, and $V_{fe}$ is the level of $V_f$ when it equals the minimum peak level of triangular signal $W_a$.

Based on said equations (1) and (3), duty cycle d can be expressed as a linear function of input voltage $V_{in}$ as shown in equation (4) below.

$$d = -A \cdot V_{in} + B \quad (4)$$

wherein, $A = K_a/(V_{fs} - V_{fe})$ and $B = (C - V_{fe})/(V_{fs} - V_{fe})$.

Based on said equations (2) and (4), pseudo input voltage $E_x$ at node $N_x$ can be expressed as a second degree of input voltage $V_{in}$ as shown in equation (5) below.

$$Ex = -A \cdot V_{in}^2 + BV_{in} \quad (5)$$

Figure 11:
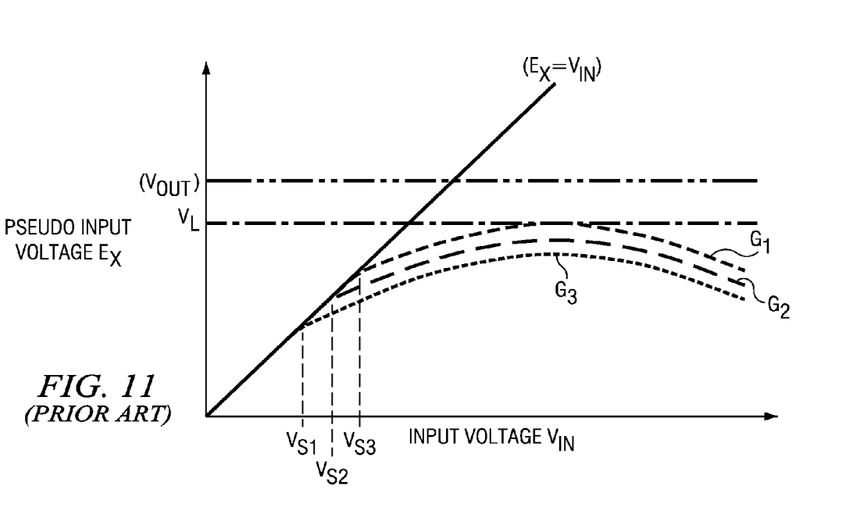
FIG. 11 is a diagram illustrating the relationship between the input voltage and the pseudo input voltage in the DC-DC converter shown in FIG. 8.

FIG. 11 shows the relationship between input voltage $V_{in}$ and pseudo input voltage $E_x$. As described above, when input voltage $V_{in}$ is lower than set level $V_s$, $E_x = V_{in}$ in the step-up mode. When input voltage $V_{in}$ is higher than set level $V_s$, said equation (5) becomes valid in the step-up/down mode. Set level $V_s$ can be selected at will as $V_{s1}$, $V_{s2}$, $V_{s3}$ shown in FIG. 11 by adjusting the voltage-dividing ratio of resistance voltage-dividing circuit 118.

Figure 12:
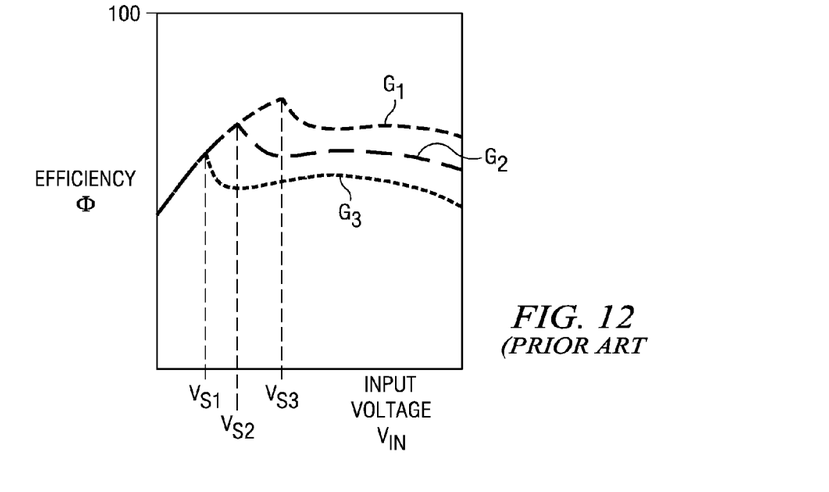
FIG. 12 is a diagram illustrating the relationship between the input voltage and efficiency of the DC-DC converter shown in FIG. 8.

In FIG. 11, $V_L$ is the upper limit for pseudo input voltage $E_x$. When pseudo input voltage Ex exceeds upper limit $V_L$, the boosting margin $(V_{out} - V_L)$ on the side of booster circuit 104 cannot be guaranteed. Also, if the output voltage $V_{out}$ exceeds the nominal level, the regulation of booster circuit 104 becomes ineffective, and the transient response becomes poor. Consequently, it is necessary to select set level $V_s$ with a margin so that pseudo input voltage $E_x$ will not exceed upper limit $V_L$. However, as shown in FIG. 12, as the set level $V_s$ is reduced, efficiency $\phi$ in the step-up/down mode is also decreased. In this case, efficiency $\phi$ is the result of dividing the output power by the effective input power (expressed as a percentage). The characteristic curves $g_1$, $g_2$, $g_3$ in FIG. 12 correspond to the characteristic curves $G_1$, $G_2$, $G_3$ in FIG. 11, respectively. Since switching loss (power loss) occurs in feedforward converter 102 in the step-up/down mode, the efficiency tends to drop more than that in the step-up mode. This loss of efficiency is undesired. Consequently, although selection of the set level $V_{s1}$ to obtain the characteristic curve $G_1$ shown in FIG. 11 is relatively optimum, it is not good enough (not absolutely optimum).

Figure 13A:
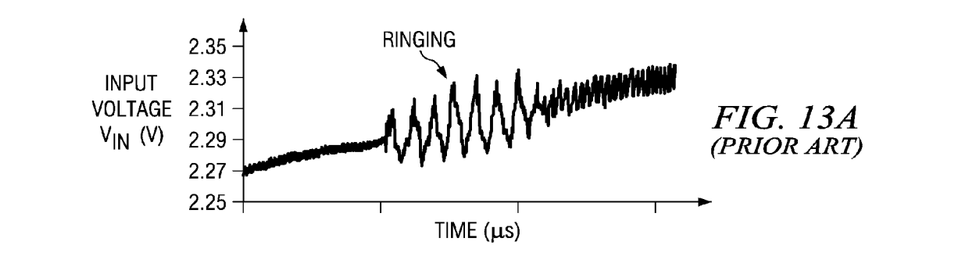
FIG. 13 is a diagram illustrating the simulated waveform of the voltage of each part of the DC-DC converter shown in FIG. 8.
Figure 13B:
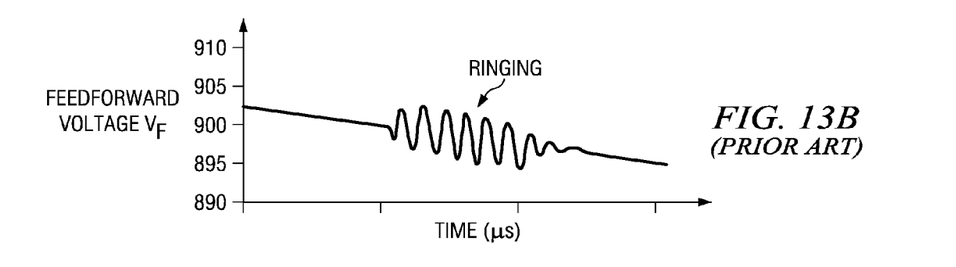
Figure 13C:
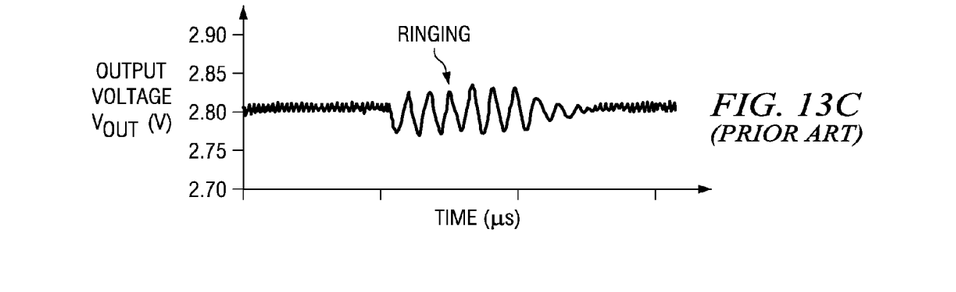

Also, in the aforementioned conventional DC-DC converter, ringing occurs in the output voltage as a result of switching between the step-up mode and the step-up/down mode. FIG. 13 shows a simulation example. The cause of the ringing is explained below.

Usually, the input voltage $V_{in}$ of battery BT is input to voltage input terminal IN via a power supply line (wiring) on the circuit substrate. At any time, a voltage drop $\delta V$ in proportion to the product of the impedance (intrinsic value) of the power supply line and input current $I_{in}$ occurs. Consequently, $(V_{BT} - \delta V)$, obtained by subtracting the voltage drop $\delta V$ on the power supply line from output voltage $V_{BT}$ of battery BT, is input as input voltage to voltage $V_{in}$ input terminal IN.

Now, the output voltage $V_{BT}$ of battery $B_T$ rises, for example, in the charging mode, and the input voltage $V_{in}$ input to voltage input terminal IN exceeds the set level $V_s$. As described above, this DC-DC converter operates in the step-up mode when $V_{in} < V_s$ and switches to the step-up/down mode when $V_{in} > V_s$. However, since efficiency $\phi$ drops significantly as shown in FIG. 12 when switching to the step-up/down mode, the consumed current or input current Iin increases stepwise. When that occurs, the voltage drop $\delta V$ on the power supply line increases stepwise. The input voltage in $(V_{B_t} - \delta V)$ returns to the relationship of $V_{in} < V_s$, and the DC-DC converter switches from the step-up/down mode to the step-up mode. However, no matter whether the converter returns to the step-up mode or not, efficiency $\phi$ increases stepwise, and input current $I_{in}$ decreases stepwise. As a result, the voltage drop $\delta V$ on the power supply line also decreases stepwise, and input voltage $V_{in}(V_{BT} - \delta V)$ rises again. Then, the DC-DC converter switches from the step-up mode to step-up/down mode again when $V_{in} > V_s$. The aforementioned operation is then repeated, and the converter switches between the step-up mode and step-up/down mode. Therefore, undesired ringing occurs in the voltage of each part of the converter. The ringing occurring in the output voltage $V_{out}$ at voltage output terminal OUT will significantly deteriorate the quality and reliability of the power supply voltage to the load. Such ringing is undesirable. When the output voltage $V_{BT}$ of battery $B_T$ drops and the converter switches from the step-up/down mode to the step-up mode, ringing also occurs as described in the voltage nodes. When the change (rise or drop) of battery voltage $V_{BT}$ is alleviated, the ringing phenomenon continues during the mode transition and can lead to an oscillating state.

SUMMARY OF THE INVENTION

The purpose of the present invention is to solve the aforementioned problems of the aforementioned conventional technology by providing a DC-DC converter which can improve the efficiency in the step-up/down mode and eliminate ringing in the output voltage when switching between the step-up mode and step-up/down mode.

In order to realize the aforementioned purpose, the present invention provides a DC-DC converter having a pre-processing circuit, which in turn has a first switching element connected to one of the terminals of an inductance element via a prescribed node. Said first switching element, generates a node voltage that is almost equal to a DC input voltage at the aforementioned node in a first mode in which the aforementioned input voltage is lower than a first set voltage, and generates a node voltage having a DC component that is almost equal to the first set voltage at the aforementioned node in a second mode in which the aforementioned input voltage is higher than the aforementioned first set voltage. A booster circuit, which has a second switching element connected to the other terminal of the aforementioned inductance element, boosts the DC component of the node voltage obtained at the aforementioned node to output a DC output voltage that is almost equal to the second set voltage that is higher than the first set voltage by a prescribed amount.

In first mode of the DC-DC converter of the present invention, when the input voltage is lower than the first set voltage, the pre-processing circuit generates a node voltage that is almost equal to the input voltage at the aforementioned node. The booster circuit receives a node voltage input equivalent to the input voltage from the aforementioned node through an inductance element and outputs a voltage boosted to the second set voltage as the output voltage. In the second mode, when the input voltage is higher than the first set voltage, the pre-processing circuit generates a node voltage having a DC component that is almost equal to the first set voltage independent of the level of the input voltage at the aforementioned node. The booster circuit receives the DC component out of the node voltage from the aforementioned node as input through the inductance element and outputs a voltage boosted to the second set voltage as the output voltage.

According to a preferable embodiment of the present invention, the aforementioned pre-processing circuit keeps the aforementioned first switching element on and sends the aforementioned input voltage to the aforementioned node via the first switching element kept in the on state in the first mode and switches the first switching element at a first frequency and sends the aforementioned input voltage via the first switching element in the second mode. The aforementioned first switching element can be a transistor, for example, a MOSFET.

According to another preferable embodiment, the aforementioned pre-processing circuit has a first feedback-generating circuit that generates a first feedback signal having a voltage level corresponding to the DC component of the aforementioned node voltage, a first reference voltage generating circuit that outputs a first reference voltage corresponding to the aforementioned first set voltage, and a first switching control circuit that switches the first switching element in such a way that the first feedback signal is consistent with the first reference voltage in the second mode. In this case, preferably, the first switching control circuit switches the aforementioned first switching element under a pulse width control. In this configuration, the first switching control circuit has a first error amplifier that compares the aforementioned first feedback signal with the first reference voltage to generate a first error signal corresponding to the comparison error, a first triangular signal generating circuit that generates a first triangular signal having the aforementioned first frequency, a first comparator that compares the aforementioned first error signal and the first triangular signal and generates a first binary logic switching control signal corresponding to the relative magnitudes of the two signals. The aforementioned first switching element is switched by the aforementioned first switching control signal. By using the aforementioned feedback loop, the DC component of the node voltage can be stabilized near the first set voltage in the second mode.

According a preferable embodiment of the present invention, the first feedback-generating circuit has a low-pass filter which receives the aforementioned node voltage from the aforementioned node as input, removes the AC component from the aforementioned node voltage, and outputs a DC voltage equal to the DC component as the first feedback signal.

According to another preferable embodiment, the first feedback-generating circuit has an integrator which receives the aforementioned node voltage from the aforementioned node as input, integrates the aforementioned node voltage over time, and outputs a DC voltage expressing the integration result as the aforementioned first feedback signal.

According to yet another preferable embodiment, the first feedback-generating circuit has a pseudo node voltage generating circuit which receives the first switching control signal from the aforementioned first comparator as input and generates a pseudo node voltage. This pseudo node voltage has almost the same duty cycle as the aforementioned first switching control signal and almost the same voltage level as the aforementioned input voltage. A low-pass filter receives the aforementioned pseudo node voltage sent from the aforementioned pseudo node voltage generating circuit as input, eliminates the AC component from the aforementioned pseudo node voltage, and outputs a DC voltage expressing the DC component as the first feedback signal.

According to yet another preferable embodiment, the first feedback-generating circuit has a pseudo node voltage generating circuit which receives the first switching control signal from the aforementioned first comparator as input and generates a pseudo node voltage. This pseudo node voltage has almost the same duty cycle as the aforementioned first switching control signal and almost the same voltage level as the aforementioned input voltage. An integrator receives the aforementioned node voltage from the aforementioned node as input, integrates the aforementioned node voltage over time, and outputs a DC voltage expressing the integration result as the aforementioned first feedback signal.

According to a preferable embodiment, the booster circuit has a second feedback-generating circuit that generates a second feedback signal having a voltage level corresponding to the aforementioned output voltage, a second reference voltage generating circuit that outputs a second reference voltage corresponding to the aforementioned second set voltage, and a second switching control circuit that switches the aforementioned second switching element at a second frequency so that the aforementioned second feedback signal is consistent with the aforementioned second reference voltage. In this case, preferably, the second switching control circuit switches the aforementioned second switching element under a pulse width control. In this configuration, the second switching control circuit has a second feedback signal that compares the second feedback signal with the second reference voltage and generates a second error signal corresponding to the comparison error, a second triangular signal generating circuit that generates a second triangular signal having the aforementioned second frequency, a second comparator that compares the second error signal with the second triangular signal and generates a second binary logic switching control signal corresponding to the relative magnitudes of the two signals. The second switching element is switched by the second switching control signal.

According to a preferable embodiment of the present invention, the aforementioned first switching element of the aforementioned pre-processing circuit is connected between the input terminal used for inputting the aforementioned input voltage and the first node; a third switching element is connected between the first node and the reference potential. The pre-processing circuit keeps the third switching element off in the first mode and turns the third switching element on/off in a manner complementary to that of the first switching element in the second mode.

According to another preferable embodiment, the aforementioned first switching element of the aforementioned pre-processing circuit is connected between the input terminal used for inputting the aforementioned input voltage and the aforementioned node; a first rectifying element is connected between the aforementioned node and the reference potential. The pre-processing circuit keeps the first rectifying element off in the first mode and turns the first rectifying element on/off in a manner complementary to that of the first switching element in the second mode.

According to a preferable embodiment of the present invention, the aforementioned second switching element of the aforementioned booster circuit is connected between the other terminal of the aforementioned inductance element and the reference potential; a fourth switching element is connected between the other terminal of the aforementioned inductance element and the voltage output terminal used for outputting the aforementioned output voltage. The booster circuit turns the aforementioned fourth switching element on/off in a manner complementary to that of the second switching element.

According to another preferable embodiment of the present invention, the aforementioned second switching element of the aforementioned booster circuit is connected between the other terminal of the aforementioned inductance element and the reference potential; a second rectifying element is connected between the other terminal of the aforementioned inductance element and the voltage output terminal used for outputting the aforementioned output voltage. The booster circuit turns the aforementioned second rectifying element on/off in a manner complementary to that of the second switching element.

When the DC-DC converter of the present invention adopts the aforementioned configuration, the efficiency in the second mode can be improved such that no ringing will occur in the output voltage when switching between the first mode (usually step-up mode) and the second mode.

DETAILED DESCRIPTION OF THE DRAWINGS

In the figures, 10 represents a choke coil, 12 represents a pre-processing circuit, 14 represents a booster circuit, 16 and 18 represents switching elements, 20 represents a control circuit, 22 represents an error amplifier, 24 represents a reference voltage generating circuit, 26 represents a PWM comparator, 28 represents an inverter, 30 represents a low-pass filter (LPF), 32 represents a triangular signal generating circuit, 34 and 36 represent switching elements, 38 represents a control circuit, 40 represents an error signal detecting circuit, 54 and 56 represent inverters, and 56 represents an integrator.

In the following, preferable embodiments of the present invention will be explained with reference to FIGS. 1–7.

Figure 1:
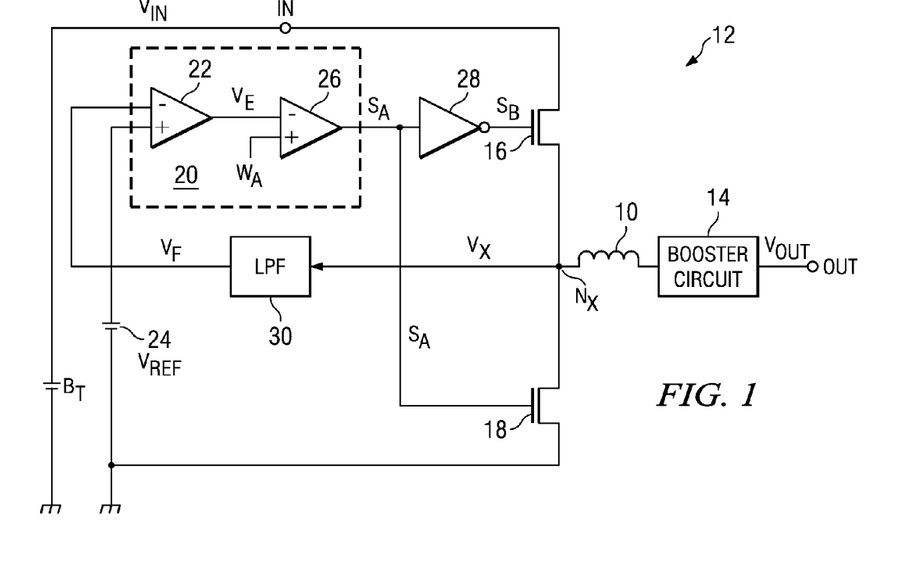
FIG. 1 is a circuit diagram illustrating the basic configuration of the DC-DC converter disclosed in the present invention.

FIG. 1 shows the basic configuration of the DC-DC converter disclosed in the present invention. The DC-DC converter comprises a chopper-type switching regulator that can be used for both step-up and step-up/down conversion. It has choke coil 10 as an inductance element. A local feedback control pre-processing circuit 12 is arranged between voltage input terminal IN, which receives DC input voltage $V_{in}$ from an external battery BT, and one of the terminals of choke coil 10 or node $N_x$. An output feedback control booster circuit 14 is arranged between the other terminal of choke coil 10 and voltage output terminal OUT. Said booster circuit 14 has a boosting function which can boost voltage $V_x$ applied from feedforward converter 12 to node $N_x$ (referred to as "node voltage $V_x$" hereinafter) and generate an output voltage $V_{out}$ of the desired level to voltage output terminal OUT. Pre-processing circuit 12, to be described later, is configured to generate node voltage $V_x$ lower than the desired level of output voltage $V_{out}$ independent of the level of input voltage $V_{in}$ at node $N_x$.

Pre-processing circuit 12 is comprised of switching element 16 connected between voltage input terminal IN and node $N_x$, switching element 18 connected between node $N_x$ and the ground potential, and control circuit 20 that turns on/off or switches said switching elements 16 and 18 in a complementary manner corresponding to the input voltage $V_{in}$ input to voltage input terminal IN. NMOS transistors, for example, can be used for switching elements 16 and 18. Control circuit 20 has error amplifier 22, reference voltage generating circuit 24, PWM comparator 26, inverter 28, and low-pass filter (LPF) 30.

LPF 30 receives input of node voltage $V_x$ obtained at node $N_x$, eliminates the AC component from node voltage $V_x$, and outputs only the DC component as local feedback signal $V_F$. Said local feedback signal $V_F$ is equivalent to $E_x$ obtained by averaging node voltage $V_x$ over time (referred to as "pseudo input voltage Ex" hereinafter). It is input to the inverting terminal (−) of error amplifier 22.

Reference voltage VREF is input as a desired set voltage $V_s$ from reference voltage generating circuit 24 to the non-inverting terminal (+) of error amplifier 22. Error amplifier 22 is an operational amplifier, which calculates and amplifies the difference of two input voltages, $V_F$ and $V_{REF}$, and outputs error voltage $V_E$ expressed as $\beta(V_{REF}-V_F)$ (referred to as "feedback error voltage $V_E$" hereinafter). In this case, β is a coefficient equivalent to the amplification factor. Feedback error voltage $V_E$ output from error amplifier 22 is applied to input terminal (−) of comparator 26.

A triangular signal $W_A$ having a prescribed frequency and a prescribed voltage level or peak level is input from a triangular signal generating circuit that is not shown in the figure to input terminal (+) of comparator 26. Comparator 26 compares the voltage levels of input signals $V_E$ and $W_A$. When $V_E > W_A$, an output voltage, control signal $S_A$ with level L, is output. When $V_E < W_A$, control signal $S_A$ with level H is output. Control signal $S_A$ is applied to the control terminal of switching element 18. Control signal $S_B$, obtained by inverting $S_A$ using inverter 28, is applied to the control terminal of switching element 16.

In the configuration example shown in the figure, the maximum peak level of triangular signal $W_A$ applied to input terminal (+) of comparator 26 is set to a prescribed level, such as zero volts. When the voltage level of local feedback signal $V_F$ output from LPF 30 is lower than reference voltage $V_{REF}$ (set level $V_s$), a positive error voltage $V_E$ is output from error amplifier 22, and comparator 26 generates an output voltage with level L. As a result, switching element 18 is turned off by level L of control signal $S_A$, while switching element 16 is turned on by level H of control signal $S_B$. Input voltage $V_{in}$ at voltage input terminal IN is sent to node $N_x$ via switching element 16 in the on state. When input voltage $V_{in}$ is constantly lower than reference voltage $V_{REF}$ (set level $V_s$), the aforementioned state is maintained. Switching element 18 is kept off, and switching element 16 is kept on. A node voltage $N_x$, $V_x$ of the DC component alone, which is equal to input voltage $V_{in}$, is obtained at node $N_x$. Local feedback signal $V_F$ also becomes equal to node voltage $V_x$, that is, input voltage $V_{in}$. Booster circuit 14 receives node voltage $V_x(=V_{in})$ as input from node $N_x$ via choke coil 10 and generates output voltage $V_{out}$ of the desired level as a result of the feedback-controlled boosting operation to output terminal OUT. As described above, input voltage $V_{in}$ is extracted via pre-processing circuit 12 and is then applied to booster circuit 14 via choke coil 10. A step-up mode conversion is performed by the entire DC-DC converter.

Figure 2:
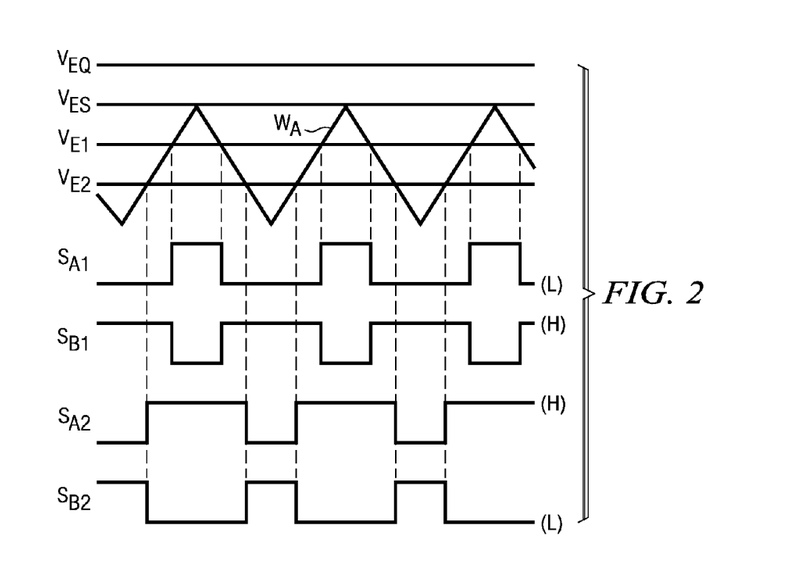
FIG. 2 is a diagram illustrating the effect of the PWM comparator in the DC-DC converter shown in FIG. 1.

When input voltage $V_{in}$ becomes higher than reference voltage $V_{REF}$ (set voltage $V_s$), that is, when the DC component of node voltage $V_x$ at node $N_x$ becomes higher than reference voltage $V_{REF}$ (set level $V_s$), the voltage level of local feedback signal $V_F$ output from LPF 30 also becomes higher than reference voltage $V_{REF}$. In this case, as shown in FIG. 2, error voltage $V_E$ output from error amplifier 22 becomes a negative voltage ($V_{E1}, V_{E2}$), which crosses with triangular signal $W_A$. One cycle of triangular signal $W_A$ is divided into the period of $V_E < W_A$ and the period of $V_E > W_A$. During the period of $V_E < W_A$, $S_A$=level H and $S_B$=level L on the output side of comparator 26. Switching element 18 is on and switching element 16 is off. On the other hand, during the period of $V_E > W_A$, $S_A$=level L, $S_B$=level H on the output side of comparator 26. Switching element 16 is on and switching element 18 is off. The pseudo input voltage $E_x$, obtained by averaging node voltage $V_x$ obtained at node $N_x$ over time, can be expressed by equation (6) below, where the duty cycle when switching element 16 is on during one cycle of triangular signal $W_A$ is taken as $D_A$.

$$E_x = D_A \cdot V_{in} \quad (6)$$

As described above, when input voltage $V_{in}$ is higher than set level $V_s$, input voltage $V_{in}$ is reduced by to the level of pseudo input voltage $E_A$ corresponding to the duty cycle $D_A$ ($0 < D_A < 1$) in pre-processing circuit 12 and is then applied to booster circuit 14 via choke coil 10. A step-up/down conversion is performed by the entire DC-DC converter.

A fact that should be noted in the step-up/down mode of the DC-DC converter is that the duty cycle D in pre-processing circuit 12 can be adjusted dynamically by feedback control to make local feedback signal $V_F$ output from LPF 30 equal to reference voltage $V_{REF}$ (set level $V_s$). In other words, when local feedback signal $V_F$ becomes greater than reference voltage $V_{REF}$ (set level $V_s$), error voltage $V_E$ output from error amplifier 22 becomes increasingly negative, the period of $S_B$=level H, the on-time of switching element 16 on the output side of comparator 26 becomes shorter, and the DC component of node voltage $V_A$ at node $N_x$ decreases. At that time, local feedback signal $V_F$ decreases towards reference voltage $V_{REF}$ (set level $V_s$). Then, when local feedback signal $V_F$ becomes lower than reference voltage $V_{REF}$ (set level $V_s$), error voltage $V_E$ output from error amplifier 22 becomes positive. The period of $S_B$=level H, the on-time of switching element 16 on the output side of comparator 26, is retained continuously and the DC component of node voltage $V_A$ at node $N_x$ increases. As a result, local feedback signal $V_F$ rises to exceed reference voltage $V_{REF}$ (set level Vs) again. Subsequently, the operation is repeated as described above.

As described above, in the step-up/down mode, when the feedback control of PWM is conducted by pre-processing circuit 12, the DC component of node voltage $V_x$ at node $N_x$, pseudo input voltage $E_x$, is retained near reference voltage $V_{REF}$ (set level $V_s$).

Figure 3:
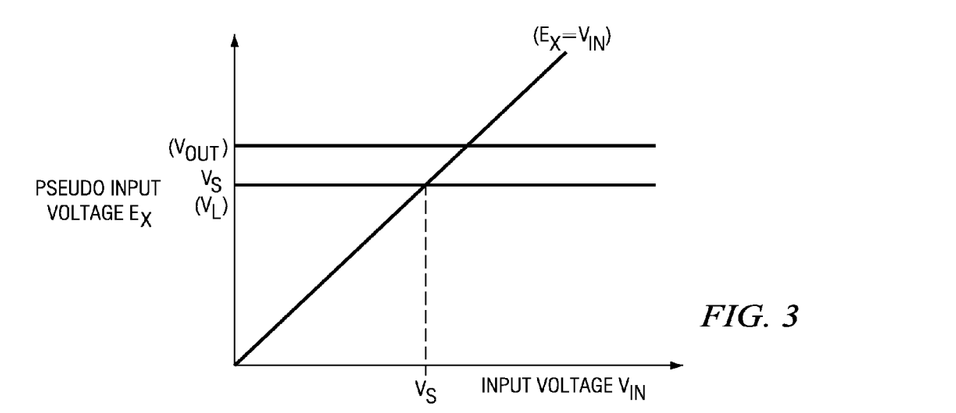
FIG. 3 shows the relationship between the input voltage and the pseudo input voltage in the DC-DC converter shown in FIG. 1.

FIG. 3 shows the relationship between input voltage $V_{in}$ and pseudo input voltage $E_x$ in the DC-DC converter disclosed in this embodiment. As described above, in the step-up mode when input voltage $V_{in}$ is lower than set level $V_s$, $E_x = V_{in}$. In the step-up/down mode when input voltage $V_{in}$ is higher than set level $V_s$, $E_x \approx V_s$ irrespective of the level of $V_{in}$. Consequently, by selecting a set level $V_s$ equal to the upper limit $V_L$ of pseudo input voltage $E_x$ for guaranteeing safe step-up/down operation, pseudo input voltage $E_x$ at node $N_x$ can be fixed near upper limit $V_L$ ($V_s$) and approach the ideal characteristic irrespective of the level of $V_{in}$ in the step-up/down mode. Efficiency $\phi$ can thus be increased without deteriorating the accuracy or transient response characteristic of output voltage $V_{out}$. In other words, absolute optimization can be achieved.

Also, ringing in the voltage of each part can be minimized or effectively prevented during switching between the step-up mode and step-up/down mode. In other words, since an efficiency $\phi$ that is not inferior to that of the step-up mode can be obtained in the step-up/down mode of DC-DC converter, the change in the input current and the corresponding change in voltage $\delta V$ of the power supply line during mode switching become small. Therefore, the possibility of the converter switching between the step-up mode and the step-up/down modes several times is reduced. Even if there is ringing in the input voltage line, since pseudo input voltage $E_x$ at node $N_x$ of pre-processing circuit 12 is kept to a certain level near set level $V_s$ as a result of the aforementioned local feedback control, the influence of the ringing is blocked, and there is no ringing in output voltage $V_{out}$ obtained at voltage output terminal OUT of booster circuit 14.

Figure 4:
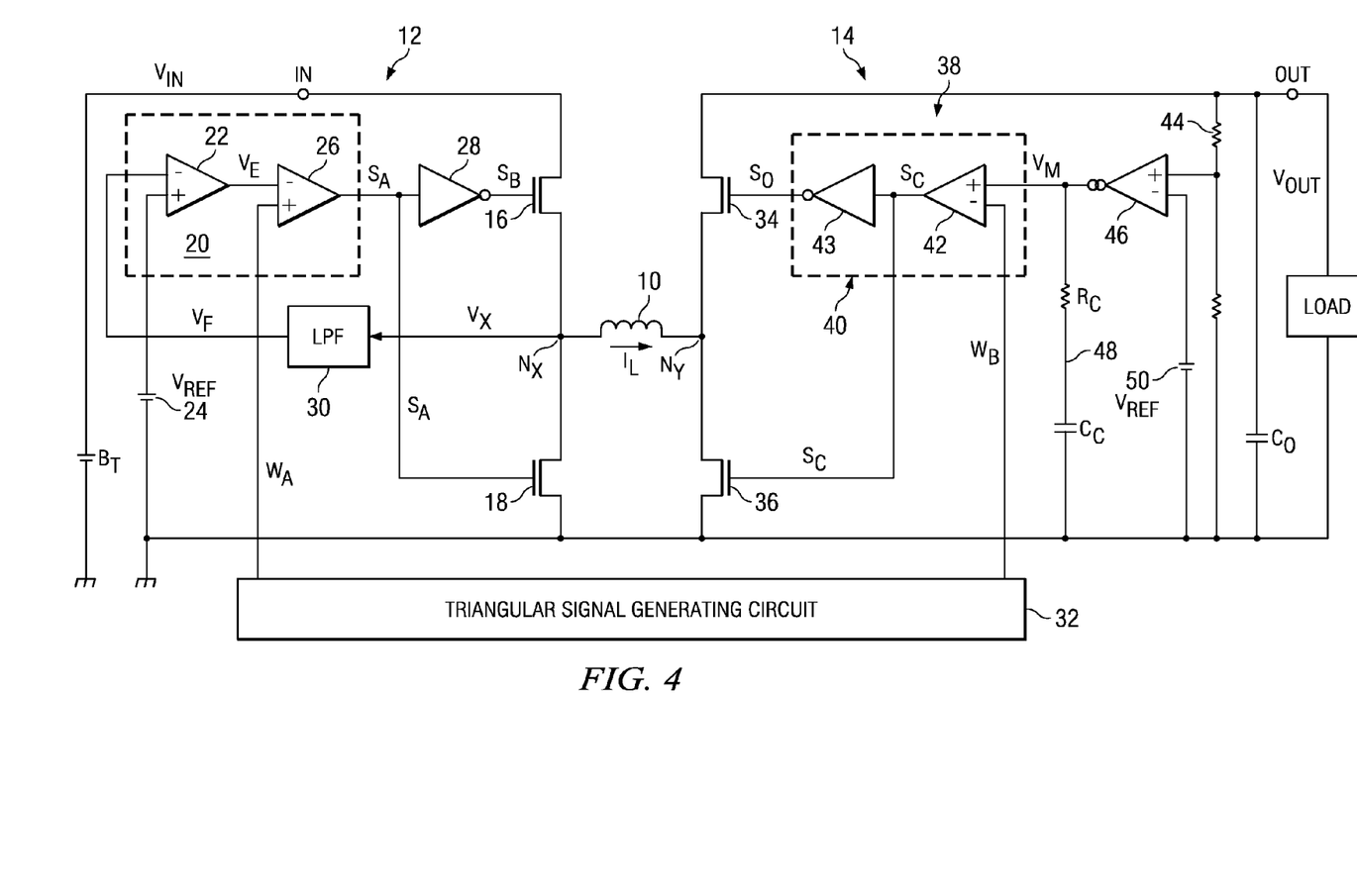
FIG. 4 is a circuit diagram illustrating the configuration of the DC-DC converter disclosed in the first embodiment.

FIG. 4 shows the circuit configuration of the DC-DC converter disclosed in the first embodiment. In this embodiment, pre-processing circuit 12 has the same configuration and conducts the same operation as said basic circuit (FIG. 1). However, comparator 26 receives input of triangular signal $W_A$ from triangular signal generating circuit 32.

Booster circuit 14 is comprised of switching element 34 connected between the other terminal of choke coil 10 or node $N_Y$ and voltage output terminal OUT, switching element 36 connected between node $N_Y$ and the ground potential, control circuit 38 that switches said two switching elements 34 and 36 in a complementary manner corresponding to the output voltage $V_{out}$ obtained at voltage output terminal OUT, and capacitor $C_o$ used for smoothing output voltage $V_{out}$. NMOS transistors can be used for switching elements 34 and 36.

Control circuit 38 has error signal detecting circuit 40, PWM comparator 42, and inverter 43. In this case, error signal detecting circuit 40 is comprised of resistance voltage-dividing circuit 44, current output type amplifier 46, output circuit 48, and reference voltage generating circuit 50. Current output type amplifier 46 is a $g_m$ amplifier, which controls the level of the output current according to the input voltages. A DC voltage Kb, obtained by dividing output voltage $V_{out}$ at a prescribed voltage-dividing ratio Kb using resistance voltage-dividing circuit 44, is input to one of its input terminals, and reference voltage $V_{REF}$ sent from reference voltage generating circuit 50 is input to the other input terminal. An error signal or feedback error signal $V_M$ indicating the difference of the two input voltages ($K_b V_{out} - V_{REF}$) is output. Output circuit 48 is made of resistor $R_c$ and capacitor $C_c$ connected in series between the output terminal of current output type amplifier 46 and the ground potential. It is used to adjust the gain and stabilize feedback error signal $V_M$.

Feedback error signal $V_M$, obtained at the output terminal of current output type amplifier 46, is input to input terminal (+) of comparator 42. Triangular signal $W_B$, generated by triangular signal generating circuit 32, is input to input terminal (−) of comparator 46. Said triangular signal $W_B$ can be the same as triangular signal $W_A$, applied to comparator 26 in pre-processing circuit 12, or have at least one of its frequency, phase, voltage, or peak level characteristics different.

Comparator 42 compares the voltage level of feedback error signal $V_M$ and the voltage level of triangular signal $W_B$. When $V_M > W_B$, an output voltage, control signal $S_c$ with level H, is output. When $V_M < W_B$, control signal $S_c$ with level L is output. Control signal $S_c$ is applied to the control terminal of switching element 36, while control signal $S_D$, obtained by inverting $S_C$ using inverter 43, is applied to the control terminal of switching element 34.

When switching element 34 is off and switching element 36 is on, a relatively large coil current $I_L$ flows from node $N_x$ on the side of pre-processing circuit 12 to the ground via choke coil 10 and switching element 36 to store energy in choke coil 10. When switching element 34 is turned on and switching element 36 is turned off, the energy is released from choke coil 10 to the side of voltage output terminal OUT via switching element 34. Output voltage $V_{out}$ obtained at voltage output terminal OUT can be expressed by equation (7) below, where $D_B$ is the duty cycle of the period when switching element 34 is on during one cycle of triangular signal $W_B$.

$$V_{out} = E_x / D_B \quad (7)$$

Since duty cycle $D_B$ is restricted to the range of 0 to 1, output voltage $V_{out}$ is definitely higher than pseudo input voltage $E_x$ at node $N_x$ on the side of pre-processing circuit 12. Since the aforementioned pseudo input voltage $E_x$ is kept stably near set level $V_s$ irrespective of the voltage level of input voltage $V_{in}$ in the step-up/down mode in this embodiment, the duty cycle $D_B$ on the side of booster circuit 14 is also fixed near a certain value, and stable and highly efficient boosting can be achieved.

Figure 5A:
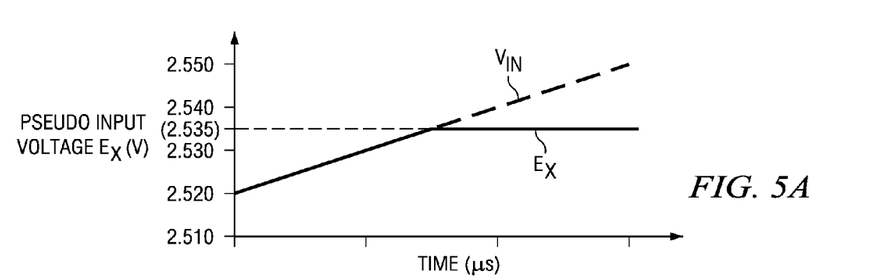
FIG. 5 is a diagram illustrating the simulated waveform of the voltage of each part of the DC-DC converter shown in FIG. 4.
Figure 5B:
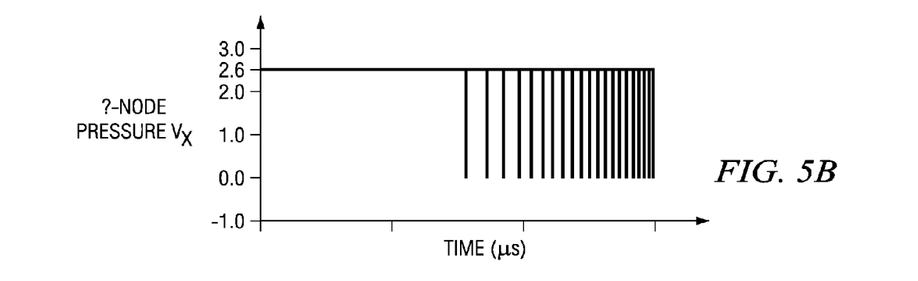
Figure 5C:
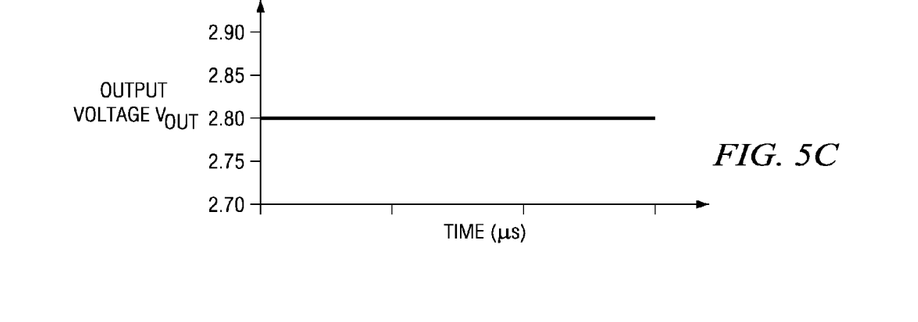

FIG. 5 shows simulated waveforms of each voltage, that is, input voltage $V_{in}$, pseudo input voltage $E_x$, node voltage $V_x$, and output voltage $V_{out}$ when the DC-DC converter of this embodiment switches from the step-up mode to the step-up/down mode. In this simulation, set level $V_s$ is 2.535 V, and input voltage $V_{in}$ is increased linearly over time to exceed set level $V_{in}$ at a certain time point. As described above, the operation is carried out in the step-up mode until input voltage $V_{in}$ exceeds set level $V_s$. After the input voltage $V_{in}$ exceeds set level $V_s$, the operation switches to the step-up/down mode.

As shown in FIG. 5, before input voltage $V_{in}$ reaches set level $V_s$ (in the step-up mode), pseudo input voltage $E_x$ rises linearly along with input voltage $V_{in}$ over time. However, after input voltage $V_{in}$ exceeds set level $V_s$ (in the step-up/down mode), pseudo input voltage $E_x$ is kept at a certain level near the set level $V_s$ (2.535 V) independent of the level of input voltage $V_{in}$. Also, for node voltage $V_x$, before input voltage $V_{in}$ reaches set level $V_s$ (in the step-up mode), when switching element 16 is kept in the on state, only the DC component identical to input voltage $V_{in}$ rises linearly over time. However, after input voltage $V_{in}$ exceeds set level $V_s$ (in the step-up/down mode), when switching element 16 in pre-processing circuit 12 is turned on/off at a variable duty cycle $D_A$ (decreases gradually as shown in FIG. 5), a negative pulse or an AC component appears in node voltage $V_x$. Output voltage $V_{out}$ is maintained at a constant level (2.80 V) without any change (no ringing during transition) in both the step-up mode and the step-up/down mode.

Figure 6:
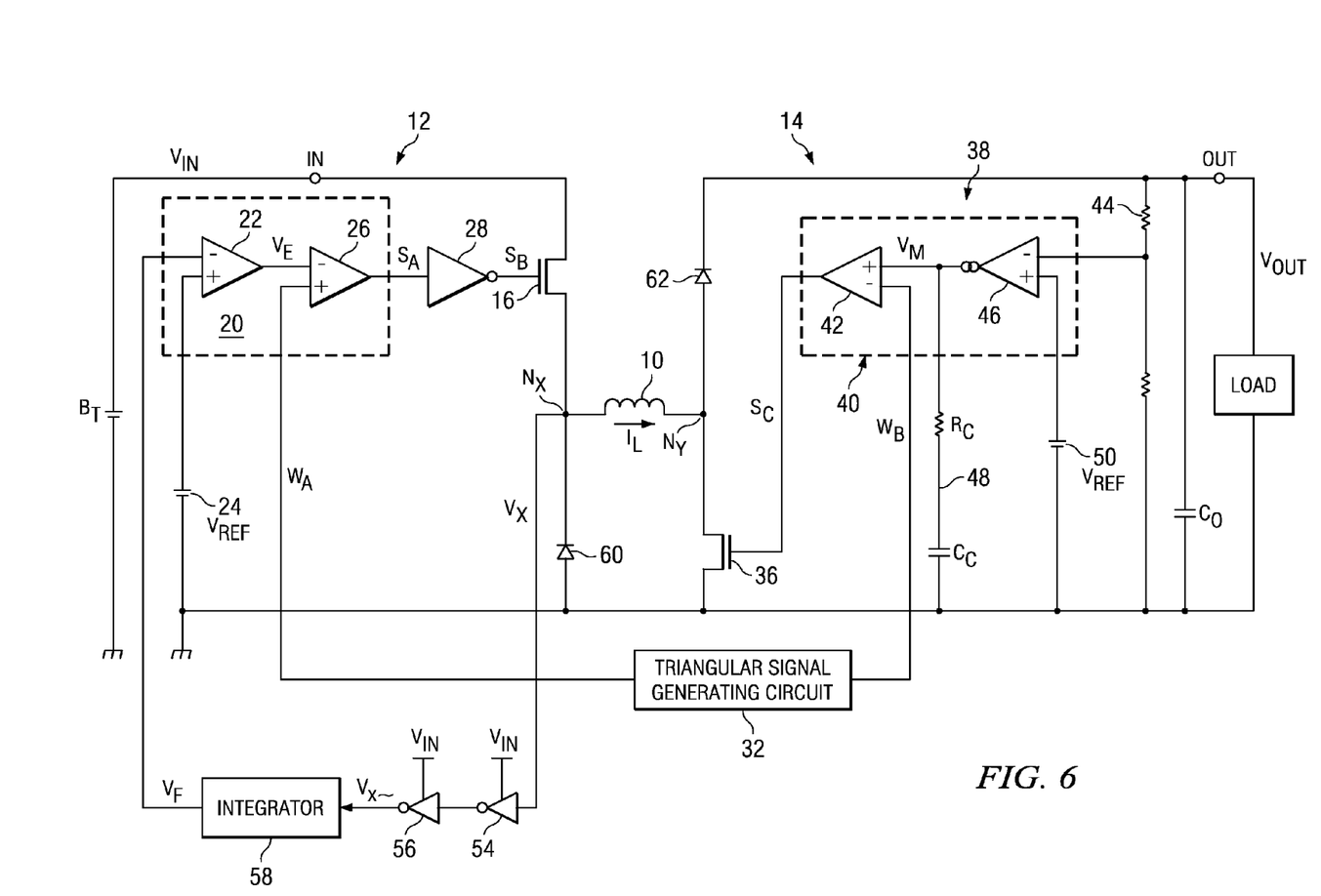
FIG. 6 is a circuit diagram illustrating the configuration of the DC-DC converter disclosed in the second embodiment.

FIG. 6 shows the circuit configuration of the DC-DC converter disclosed in the second embodiment. The parts with the same configurations or functions as those described in the first embodiment (FIG. 4) are represented by the same symbols, respectively.

In the second embodiment, two stages of inverters, 54 and 56, and integrator 58 are used as the feedback circuit used for generating pseudo input voltage $V_x$ at node $N_x$ in pre-processing circuit 12 in the form of local feedback signal $V_F$. Node voltage $V_x$ is input from node $N_x$ to inverter 54 in the first stage. Both inverters 54 and 56 are made of operational amplifiers that use the input voltage $V_{in}$ as the power supply voltage. When the input is level H, an output voltage of level L is output. When the input is level L, an output voltage of level H having the level of input voltage $V_{in}$ is output. In this way, voltage $V_x'$ equivalent to node voltage $V_x$ at node $N_x$ is obtained at the output terminal of inverter 56. Integrator 58 receives output voltage $V_x'$ as input from inverter 56, integrates this voltage $V_x'$ over time, and outputs a DC voltage expressing the integrated value as local feedback signal $V_F$. Said integrator 58 can be replaced by a low-pass filter (LPF). In the first embodiment (FIG. 4), low-pass filter (LPF) 30 can also be replaced by an integrator.

In the second embodiment, diode 60 is connected between node $N_x$ and ground in pre-processing circuit 12. In booster circuit 14, diode 62 is connected between node $N_Y$ and voltage output terminal OUT. Diode 60 has its cathode terminal facing node $N_x$. When switching element 16 is on, it is virtually off in the reverse-bias state. When switching element 16 is off, it is virtually on (conductive) in the forward-bias state. Diode 62 has its anode terminal facing node $N_Y$. When switching element 36 is off, it is virtually off in the reverse-bias state. When switching element 36 is off, it is virtually on (conductive) in the forward-bias state. Said diodes 60 and 62 have virtually the same effect as switching elements 18, 34 described in the first embodiment (FIG. 4).

In the second embodiment, the same effects as those described in the first embodiment can be realized in each mode (step-up mode/step-up/down mode).

Figure 7:
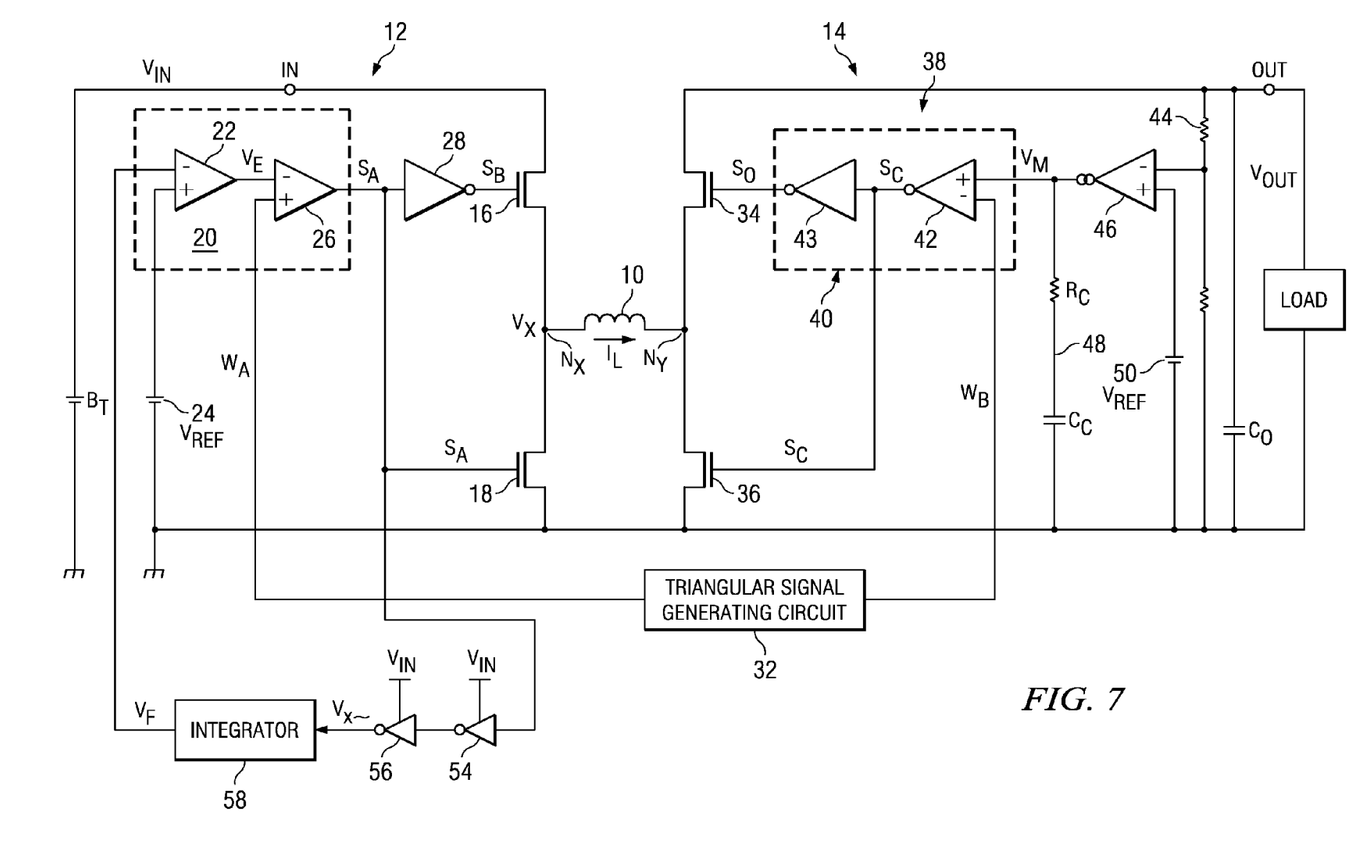
FIG. 7 is a circuit diagram illustrating the configuration of the DC-DC converter disclosed in the third embodiment.

FIG. 7 shows the circuit configuration of the DC-DC converter disclosed in the third embodiment. The parts with the same configurations or functions as those described in the first embodiment (FIG. 1) or the second embodiment (FIG. 6) are represented by the same symbols, respectively.

In the third embodiment, the local feedback circuit in pre-processing circuit 12 is comprised of two stages of inverters, 54 and 56, and integrator 58. However, the output voltage ($S_B$) of comparator 26 is input to inverter 54 in the first stage. Since inverters 54 and 56 output a voltage of level H having the level of input voltage $V_{in}$ when a level L is input, a pseudo voltage $V_x''$ equivalent to node voltage $V_x$ at node $N_x$ is obtained at the output terminal of inverter 56. Consequently, a DC voltage, that is local feedback signal $V_F$ obtained by generating pseudo input voltage $V_x$, is obtained from the output terminal of integrator 58. The rest of the configuration or effect is the same as the first or second embodiment.

Although not shown in the figures as an alternative example, it is also possible to use PMOS transistors or bipolar transistors, etc. as the switching elements. Also, the configuration of pre-processing circuit 12, booster circuit 14, and other parts, especially the configuration of the control unit, may have various modifications. Other inductance elements can also be used instead of choke coil 10. Also, the aforementioned triangular signal is not necessarily a triangular wave as long as it is a periodic signal. For example, it can be a sinusoidal signal.

The invention claimed is:

1. A DC-DC converter, comprising:
    (a) a pre-processing circuit with a first input for a DC input voltage, a second input for a reference voltage, an output for a first terminal of an inductor, and a first switch between said output for a first terminal and said input for a DC input voltage;
    (b) a booster circuit with an input for a second terminal of said inductor, an output for a DC output voltage, and a second switch between said input for a second terminal and a ground;
    (c) wherein when said DC input voltage is less than said reference voltage, said pre-processing circuit is operable to maintain said first switch as conductive and when said DC input voltage is greater than said reference voltage said pre-processing circuit is operable to control said first switch to have said reference voltage equal to a lowpass-filtered voltage at said output for a first terminal; and
    (d) wherein said reference voltage is less than said DC output voltage and said booster circuit is operable to control said second switch to generate said DC output voltage from output of said pre-processing circuit when an inductor is connected between said output for a first terminal and said input for a second terminal.

2. The DC-DC converter of claim 1, wherein said pre-processing circuit controls said first switch with the output of a comparator which has (i) a first input equal to an amplification of the difference between said reference voltage and said lowpass-filtered voltage at said output for a first terminal and (ii) a second input equal to a voltage with a triangular waveform.

3. The DC-DC converter of claim 1, wherein said booster circuit controls said second switch with the output of a comparator which has (i) a first input equal to an amplification of the difference between said reference voltage and a fraction of said DC output voltage and (ii) a second input equal to a voltage with a triangular waveform.

4. A DC-DC converter, comprising:
    (a) a pre-processing circuit with a first input for a DC input voltage, a second input for a reference voltage, an output for a first terminal of an inductor, and a first switch between said output for a first terminal and said input for a DC input voltage;
    (b) a booster circuit with an input for a second terminal of said inductor, an output for a DC output voltage, and a second switch between said input for a second terminal and a ground;
    (c) wherein when said DC input voltage is less than said reference voltage, said pre-processing circuit is operable to maintain said first switch as conductive and when said DC input voltage is greater than said reference voltage said pre-processing circuit is operable to control said first switch to have said reference voltage equal to an integrated voltage at said output for a first terminal; and
    (d) wherein said reference voltage is less than said DC output voltage and said booster circuit is operable to control said second switch to generate said DC output voltage from output of said pre-processing circuit when an inductor is connected between said output for a first terminal and said input for a second terminal.

5. The DC-DC converter of claim 4, wherein said pre-processing circuit controls said first switch with the output of a comparator which has (i) a first input equal to an amplification of the difference between said reference voltage and said integrated voltage at said output for a first terminal and (ii) a second input equal to a voltage with a triangular waveform.

6. The DC-DC converter of claim 4, wherein said booster circuit controls said second switch with the output of a comparator which has (i) a first input equal to an amplification of the difference between said reference voltage and a fraction of said DC output voltage and (ii) a second input equal to a voltage with a triangular waveform.

* * * * *